United States Patent
Ajitraj et al.

(10) Patent No.: US 11,625,727 B2
(45) Date of Patent: Apr. 11, 2023

(54) DISPUTE RESOLUTION SYSTEM INTERFACE

(71) Applicant: PayPal, Inc., San Jose, CA (US)

(72) Inventors: Savitha Ajitraj, Tamil Nadu (IN); Sarathy Rajagopalan, Tamil Nadu (IN); Manickkam Pandian, Tamil Nadu (IN); Padmini Janaki, Tamil Nadu (IN); Ramaguru Ramasubbu, Tamil Nadu (IN); Rashmi Singh Prakash, Austin, TX (US); Manvendra Sharma, Fremont, CA (US); Siddharth Zarapkar, San Jose, CA (US); Simran Kaur, Mountain View, CA (US); Donald Ross, Chicago, IL (US); Zoulfia Moret, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 481 days.

(21) Appl. No.: 16/710,306

(22) Filed: Dec. 11, 2019

(65) Prior Publication Data
US 2021/0182866 A1  Jun. 17, 2021

(51) Int. Cl.
  *G06Q 20/02* (2012.01)
  *G06Q 30/016* (2023.01)
  (Continued)

(52) U.S. Cl.
  CPC ........... *G06Q 30/016* (2013.01); *G06F 9/541* (2013.01); *G06F 16/2379* (2019.01); *G06Q 20/02* (2013.01); *G06Q 20/223* (2013.01)

(58) Field of Classification Search
  CPC .... G06Q 30/016; G06Q 20/02; G06Q 20/223; G06F 16/2379; G06F 9/541
  (Continued)

(56) References Cited

U.S. PATENT DOCUMENTS

| | | |
|---|---|---|
| 7,343,295 B2 | 3/2008 | Pomerance |
| 8,150,774 B2 | 4/2012 | Burchetta et al. |

(Continued)

FOREIGN PATENT DOCUMENTS

| | | | | |
|---|---|---|---|---|
| CN | 105051770 A | * | 11/2015 | ............. G06Q 20/04 |
| KR | 20150058474 A | * | 9/2013 | ............. G06Q 40/12 |
| KR | 20150058474 A | * | 5/2015 | ............. G06Q 20/40 |

OTHER PUBLICATIONS

Title: An Architecture and Issues for Online Dispute Resolution with Fairness and Justice Authors: Zhengchuan Xu, et al. Publication: IEEEE Date:2008 (Year: 2008).*

*Primary Examiner* — Christopher Bridges
*Assistant Examiner* — Yongsik Park

(57) ABSTRACT

A method may include operations including, receiving, at an application program interface (API) of a third party computing system, an API call related to a dispute associated with a user of an electronic device, the call being received from an electronic device to invoke a dispute resolution to the dispute. The method may include communicating, by the API in response to the API call, dispute information to dispute resolution intelligence of the third-party computing system. The method may include determining, by the dispute resolution intelligence based on the dispute information, the decision with respect to the dispute, and providing the decision to a callback interface in response to the dispute information having been received from the API. The method may additionally include communicating, by the callback interface to the electronic device identified in response to the dispute information having been received from the API, the decision to the dispute resolution.

20 Claims, 11 Drawing Sheets

(51) Int. Cl.
*G06F 9/54* (2006.01)
*G06Q 20/22* (2012.01)
*G06F 16/23* (2019.01)

(58) Field of Classification Search
USPC .......................................................... 705/39
See application file for complete search history.

(56) References Cited

U.S. PATENT DOCUMENTS

| | | | |
|---|---|---|---|
| 2006/0031177 A1* | 2/2006 | Rule | G06Q 50/182 |
| | | | 705/309 |
| 2007/0299882 A1* | 12/2007 | Padgett | G06F 16/1844 |
| 2008/0154783 A1* | 6/2008 | Rule | G06Q 50/188 |
| | | | 705/80 |
| 2010/0162276 A1* | 6/2010 | Sim | G06F 9/5038 |
| | | | 719/328 |
| 2012/0259785 A1 | 10/2012 | Ha | |
| 2013/0173449 A1 | 7/2013 | Ng et al. | |
| 2014/0379589 A1* | 12/2014 | Ratcliffe | G06Q 50/182 |
| | | | 705/309 |
| 2016/0034906 A1* | 2/2016 | Stopic | G06Q 40/12 |
| | | | 705/30 |
| 2016/0300214 A1* | 10/2016 | Chaffin | G06Q 20/22 |

* cited by examiner

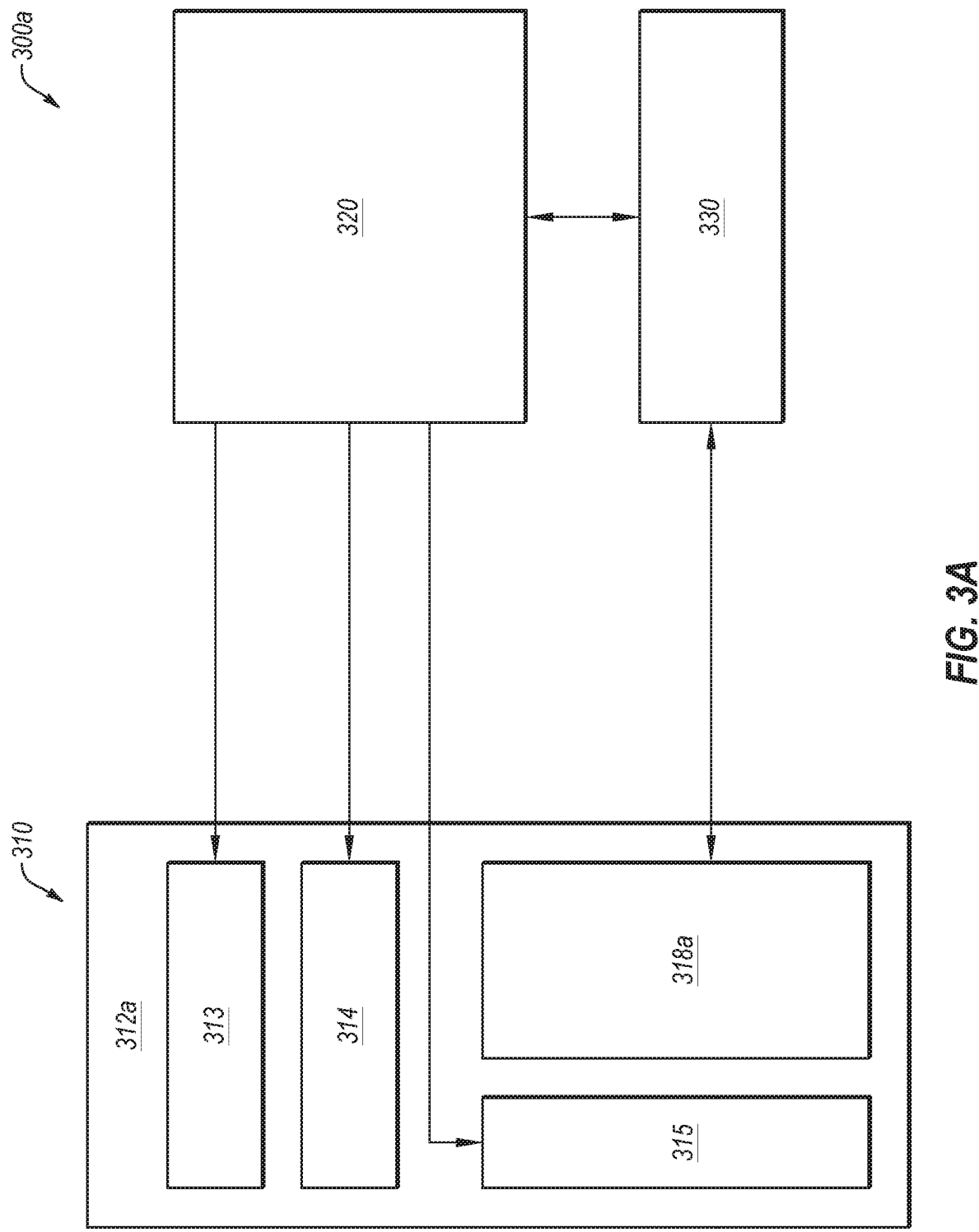

DISPUTE RESOLUTION SYSTEM INTERFACE

FIELD

The embodiments discussed in the present disclosure are related to interfacing with dispute resolution systems.

BACKGROUND

Some systems provide functionality and expertise that is desirable to other systems. However, access to such systems may be limited.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

BRIEF DESCRIPTION OF THE DRAWINGS

Example embodiments will be described and explained with additional specificity and detail through the use of the accompanying drawings in which:

FIGS. 3A and 3B illustrate example systems with user interfaces utilized in the dispute resolution of FIGS. 1 and/or 2;

DESCRIPTION OF EMBODIMENTS

Figure 1:
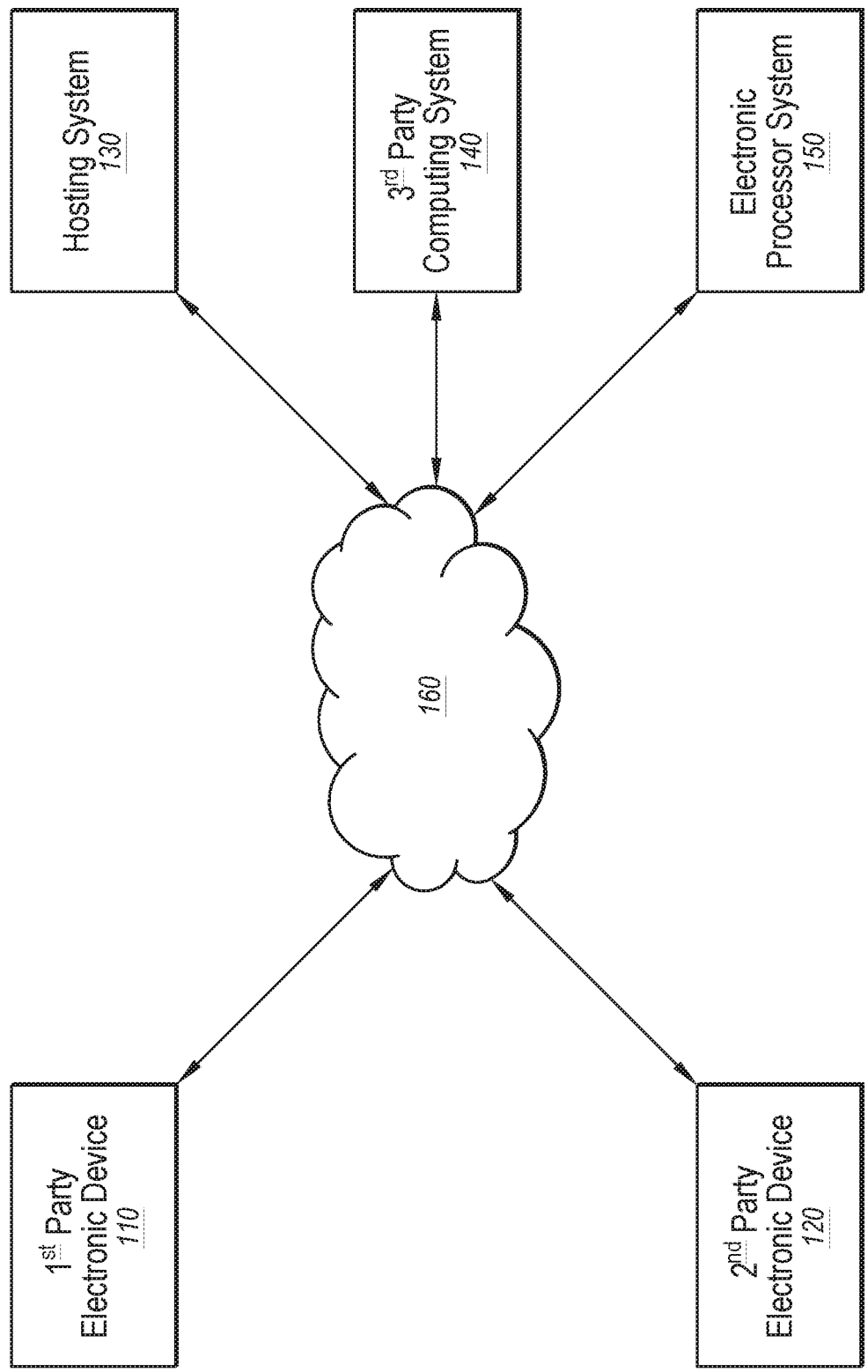
FIG. 1 illustrates a system to facilitate interfacing with a dispute resolution system.

The present disclosure may relate to the interfacing of a third party computing system that includes dispute resolution intelligence with a hosting system such that the hosting system may use the dispute resolution capabilities of the third party computing system. For example, a user of the services offered by the hosting system may interface and interact with the hosting system and the hosting system may interface with the third party computing system to resolve disputes. A dispute may arise based on some interaction the user had with the hosting system. The hosting system may receive a request from an electronic device of the user to resolve the dispute. In response, the hosting system may invoke the third party computing system via application program interface (API) calls, scripts, or other communications to leverage the third party computing system to resolve the dispute raised by the user. In doing so, the user may interact directly with the hosting system while having the dispute resolved by the third party computing system. To provide information regarding the dispute, the third party computing system may provide call backs to the hosting system based on the API calls or other communications coming from the hosting system.

The present disclosure may also relate to the use of the third party computing system to facilitate interaction with a second party to the dispute with the user. For example, the third party computing system may seek additional information to resolve a dispute, and may post a call back to a second hosting system associated with the second party. The second hosting system may then interact with an electronic device of the second party to obtain the additional information sought by the third party computing system. In this way, the second party may interface directly with the second hosting system.

The embodiments of the present disclosure solves an important problem existing solely in the context of computing systems. For example, a hosting system may have an established relationship with a user with an account with the hosting system such that the user consistently interacts with the hosting system. However, to utilize a third party computing system to resolve disputes, the hosting system may traditionally be required to redirect the electronic device of the user to the third party computing system, resulting in a loss of relationship between the hosting system and the electronic device of the user, as well as the lack of a consistent user experience regarding all interactions with the hosting system. The present disclosure facilitates the electronic device of the user remaining interfaced with the hosting system while permitting the hosting system to leverage dispute resolution of the third part computing system.

In some embodiments, the present disclosure may also facilitate the use of a third party dispute resolution service that may provide compliance with regulatory or legal requirements in various jurisdictions without having to invest heavy expertise. Additionally or alternatively, such an embodiment may facilitate the building of trust and further fostering the relationship between a hosting system and the parties utilizing the hosting system.

Embodiments of the present disclosure are explained with reference to the accompanying drawings.

FIG. 1 illustrates a system 100 to facilitate interfacing with a dispute resolution system, in accordance with one or more embodiments of the present disclosure. The system 100 may include a first party electronic device 110 and a second party electronic device 120, via which a first party and a second party may interact with each other via a hosting system 130. The system 100 may include a third party computing system 140 with dispute resolution intelligence and an electronic processor system 150. The system 100 may include a network 160 to facilitate communication among and between the various components of the system 100.

In some embodiments, a dispute may arise between the first party and the second part based on an interaction involving the hosting system 130. For example, the first party via the first party electronic device 110 may buy something from the second party on a marketplace hosted by the hosting system 130. As another example, the first party via the first party electronic device 110 may transfer funds or some other asset to the second party via an electronic system hosted by the hosting system 130. In these and other embodiments, the transactions may involve tangible goods and/or intangible goods (e.g., digital goods), and may involve a peer to peer (P2P) transaction and/or a business to consumer (B2C) transaction.

The dispute may include any reason for disagreement between the first party and the second party based on the interaction with the hosting system 130. For example, the first party may allege that they did not receive an item purchased from the second party. As another example, the first party may allege that the interaction was fraudulent and the first party did not engage in the interaction. As an additional example, the first party may allege that an amount charged to the first party was different than expected or agreed. As another example, the first party may allege that an item received was not as described, broken, defective, or have some other issue with the item received from the second party. As another example, the first party may allege that a subscription was cancelled and was continued to be charged. As an additional example, the first party may allege that a duplicate charge may occur for a single transaction. As another example, the first party may allege that a refund was not processed by the second party.

In operation, the first party may have multiple avenues to begin a dispute resolution process involving the interaction between the first party and the second party. For example, the first party via the first party electronic device 110 may log in to an account with the hosting system 130 and may request a resolution to the dispute via an interaction with the hosting system 130. As another example, if the first party used a payment method hosted by the third party computing system 140 (e.g., PAYPAL®, VENMO®, etc.), the first party via the first party electronic device 110 may log in to an account with the third party computing system 140 and may request a resolution to the dispute via an interaction with the third party computing system 140. As an additional example, if the first party used a payment method that cleared through the electronic processor system 150, the first party 110 may request a resolution to the dispute via an interaction with the electronic processor system 150 (e.g., by contacting the financial institution that uses the electronic processor system 150 to clear credit card transactions and requesting a chargeback on the transaction).

In some embodiments, the hosting system 130 may interface with the third party computing system 140 to resolve disputes. For example, the hosting system 130 may desire to maintain a presence and interaction with parties associated with the hosting system 130 while leveraging dispute resolution expertise of the third party computing system 140. In these and other embodiments, the hosting system 130 may be configured such that the first party electronic device 110 and/or the second party electronic device 120 interface directly with the hosting system 130, and the hosting system 130 invokes various programmatic calls, web scripts, programming scripts, etc. to interface with the third party computing system 140. In this way, the hosting system 130 may maintain its presence and interaction with the first party and/or the second party, rather than routing the first party electronic device 110 and/or the second party electronic device 120 to interact with the third party computing system 140.

In some embodiments in which the first party initiates a dispute via the electronic processor system 150, the dispute may be provided to the third party computing system 140 or the hosting system 130. In either embodiment, the third party computing system 140 may interface with the hosting system 130 to facilitate resolution of the dispute.

The interactions between the first party electronic device 110, the second party electronic device 120, the hosting system 130, the third party computing system 140, and/or the electronic processor system 150 in resolution of a dispute may be described in greater detail with reference to FIGS. 2 and 4-7.

Figure 10:
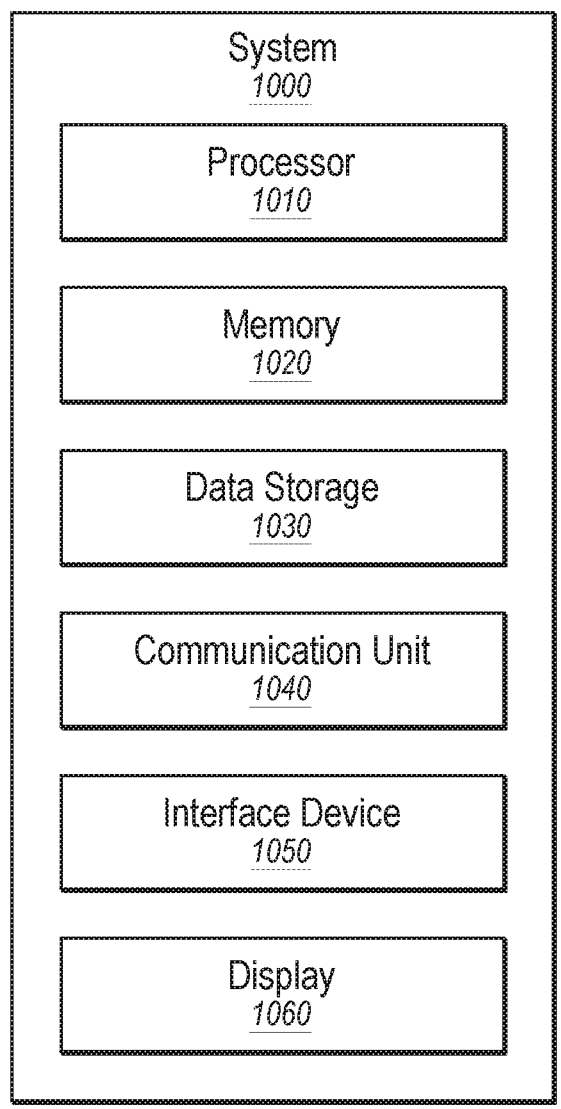
FIG. 10 illustrates an example computing system.

In some embodiments, any of the first party electronic device 110, the second party electronic device 120, the hosting system 130, the third party computing system 140, and/or the electronic processor system 150 may be implemented as a computing system such as that illustrated in FIG. 10.

The network 160 may be implemented as a conventional type network, a wired or wireless network, and/or may have any of numerous different configurations or combinations thereof. Furthermore, the network 160 may include a local area network (LAN), a wide area network (WAN) (e.g., the Internet), or other interconnected data paths across which multiple devices and/or entities may communicate. In some embodiments, the network 160 may include a peer-to-peer network. The network 160 may also be coupled to or may include portions of a telecommunications network for sending data in a variety of different communication protocols. In some embodiments, the network 160 may include Bluetooth® communication networks or cellular communication networks for sending and receiving communications and/or data including via short message service (SMS), multimedia messaging service (MMS), hypertext transfer protocol (HTTP), direct data connection, wireless application protocol (WAP), e-mail, or other approaches. The network 160 may also include a mobile data network that may include third-generation (3G), fourth-generation (4G), fifth-generation (5G), long-term evolution (LTE), long-term evolution advanced (LTE-A), Voice-over-LTE ("VoLTE") or any other mobile data network or combination of mobile data networks.

Modifications, additions, or omissions may be made to the system 100 without departing from the scope of the present disclosure. For example, the system 100 may include more or fewer elements than those illustrated and described in the present disclosure. For example, the system 100 may include any number of parties involving any number of disputes. As another example, any number of hosting systems may be involved, such as the first party interfacing with a first hosting system and the second party interfacing with a second hosting system.

Figure 2:
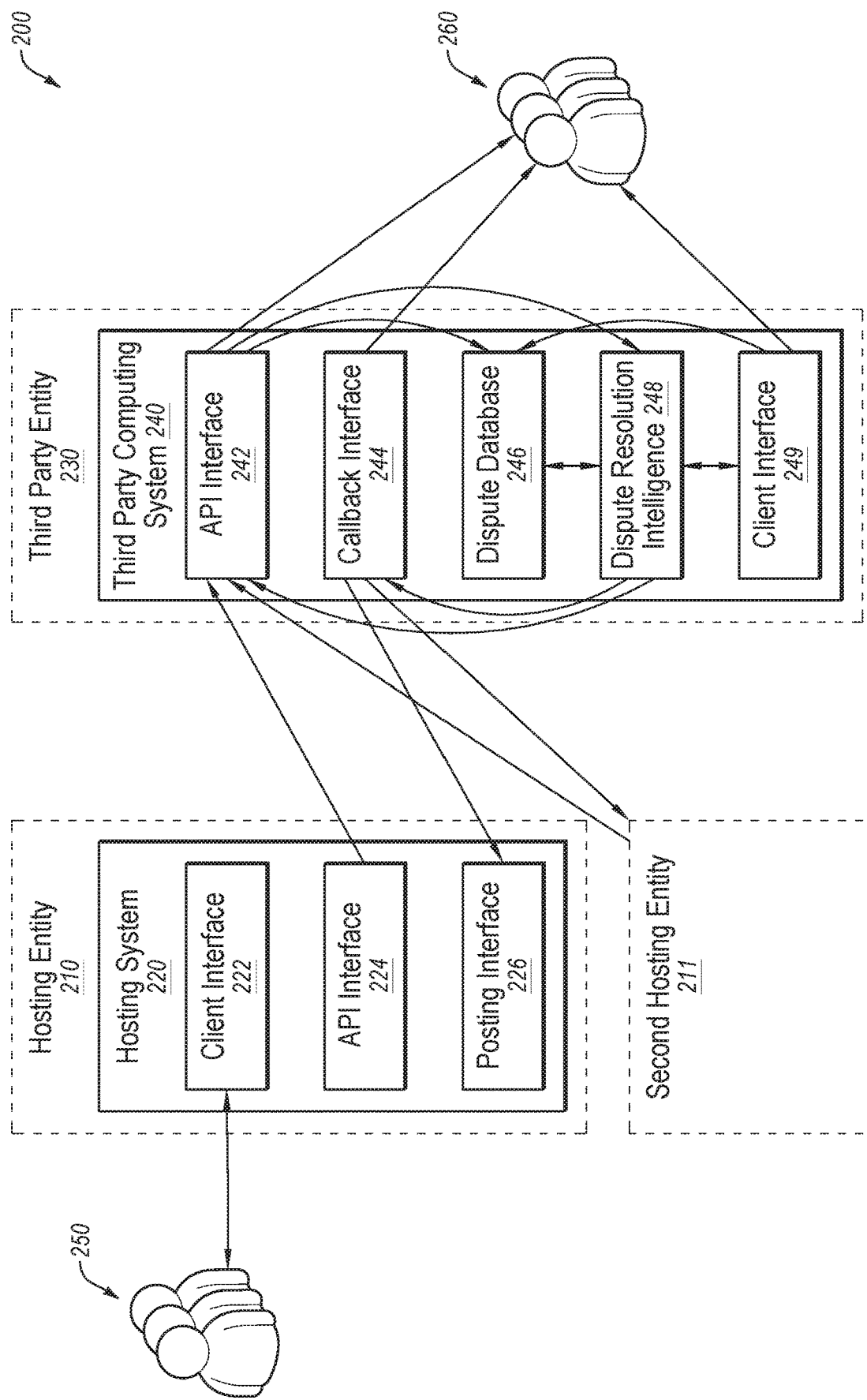
FIG. 2 illustrates another example system to facilitate interfacing with a dispute resolution system.

FIG. 2 illustrates another example system 200 to facilitate interfacing with a dispute resolution system, in accordance with one or more embodiments of the present disclosure. The system 200 may include a hosting entity 210 with a hosting system 220, and a third party entity 230 with a third party computing system 240. The system may also include a second hosting entity 211 with a second hosting system (not illustrated). One or more parties 250 may interact with the hosting system 220 using electronic devices. Additionally, one or more other parties 260 may interact directly with the third party computing system 240 directly using associated electronic devices.

Figure 3B:
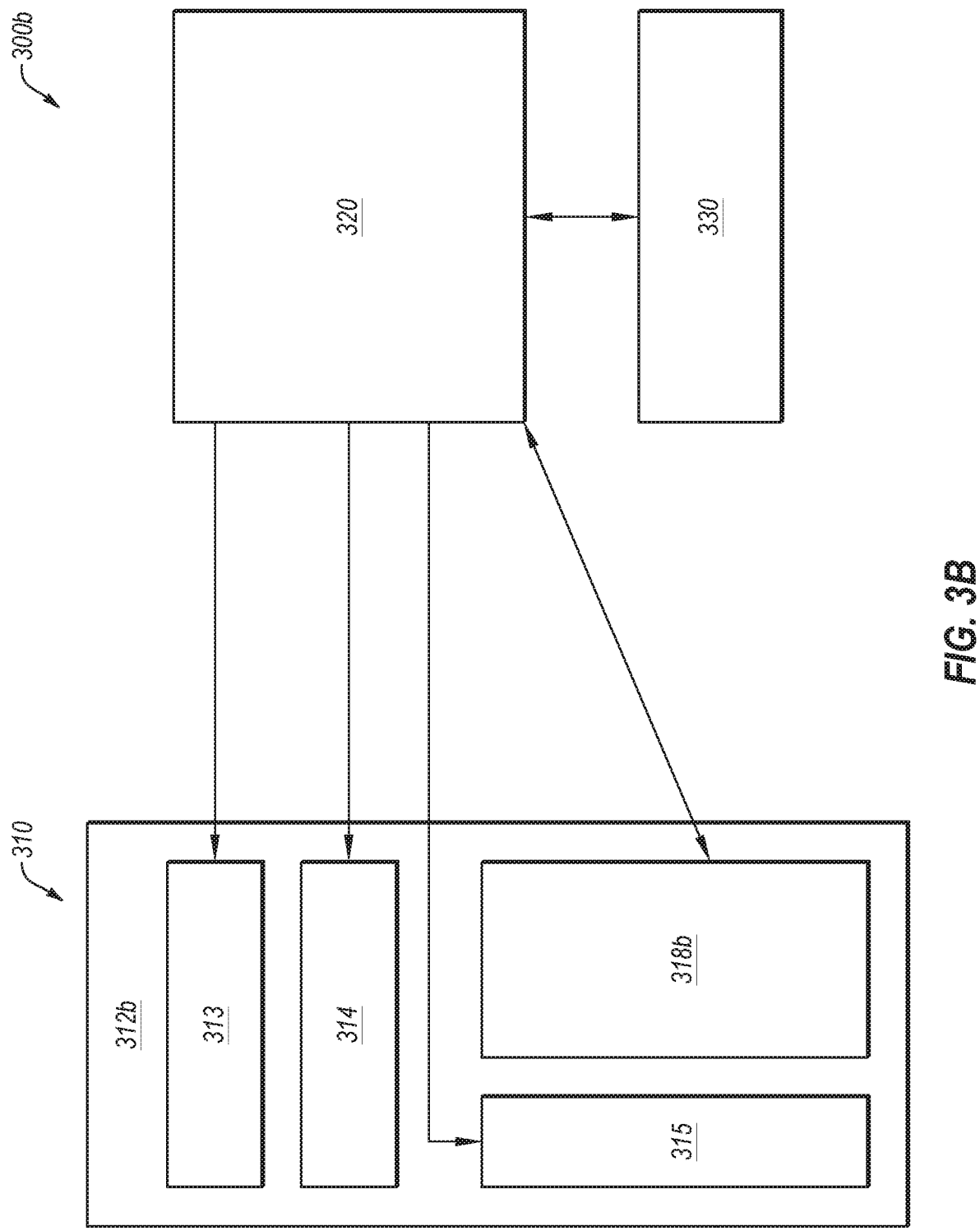

The hosting system 220 may include a client interface 222 via which the party 250 may interact with the hosting system 220. For example, the client interface 222 may include a graphical user interface (examples of which are illustrated in FIGS. 3A and 3B) that is displayed on the electronic device of the party 250 such that the party 250 may interact with the hosting system 220. Such interaction may include utilizing a service offered by the hosting entity 210, including purchasing goods or services in a marketplace, transferring assets to another party, or any other service. Other interactions may include designating a certain previous interaction to be disputed, providing additional information regarding the previous interaction, uploading files, etc.

The hosting system may additionally or alternatively include an API interface 224 via which the hosting system 220 may interface with the third party computing system 240. For example, the hosting system 220 may submit API calls over the API interface 224 to the third party server 240.

The hosting system may additionally or alternatively include a posting interface 226 via which the third party computing system 240 may interface with the hosting system 220. For example, the third party computing system 240 may submit call back postings over a call back interface 244 to the posting interface 226 of the hosting system 220. In some embodiments, such call backs may be in the form of a webhook via which a known uniform resource locator (URL) of the hosting system 220 is provided to the call back interface 244 of the third party computing system 240 such that the call back function includes the posting of data to the URL of the posting interface 226 by the third party computing system 240 via the call back interface 244. Additionally or alternatively, the posting interface 226 may be an interface via which the third party computing system 240 sends information through other communication modalities between electronic devices. For example, the posting interface may utilize an instant payment notification (IPN) modality to provide information back to the hosting system 220. In some embodiments, an API call may come via the API interface 224, such as a List API, or some other communication such as a batch notification, to invoke the call back interface 244 to provide some or all of the details of a particular dispute or set of disputes being handled by the third party computing system 240.

The second hosting entity 211 may include an associated second hosting system (not illustrated) with which other parties may interact. For example, in some embodiments, the party 250, via their electronic device, may interface with the hosting system 220 while a second party, via their electronic device, may interface with the second hosting system of the second hosting entity 211. In these and other embodiments, the interfacing of the party 250 and/or the second party may be in the context of instigating, updating, or resolving a dispute.

The third party computing system 240 may include an API interface 242 via which the third party computing system 240 receives API calls. For example, the hosting system 220 may invoke an API call to initiate a dispute resolution for a dispute that is sent to the third party computing system 240 from the API interface 224 of the hosting system 220 to the API interface 242 of the third party computing system 240.

The third party computing system 240 may additionally or alternatively include the call back interface 244 via which the third party computing system 240 may return information to the hosting system 220 in response to an API call received at the API interface 242. Additionally or alternatively, the call back interface 244 may be utilized to provide information or request information at the request of the third party computing system 240.

The third party computing system 240 may additionally or alternatively include the dispute database 246. The dispute database 246 may store data related to disputes to facilitate resolution of disputes by the third party computing system 240. For example, the dispute database 246 may create a dispute object in response to an incoming API call at the API interface 242 in which data regarding a particular dispute may be tracked. As another example, the dispute database 246 may store information regarding one or more of the parties 250 or the parties 260. Such information may include purchase histories (e.g., dates, times, IP addresses from which purchases were made, amounts, billing address, shipping address, items or services purchased, details of the items or services purchased, URL of the item or service purchased, etc.), personal information (e.g., contact information, physical address, age, income bracket, known credit cards or bank accounts, etc.), dispute histories (e.g., dates, times, number of disputes, results of disputes, types of disputes, etc.), etc., or any combinations thereof.

The third party computing system 240 may additionally or alternatively include the dispute resolution intelligence 248. In some embodiments, the dispute resolution intelligence 248 may be configured to utilize any information obtained from the parties to the dispute and/or information from the dispute database 246 to render a decision regarding the dispute.

In some embodiments, the dispute resolution intelligence 248 may be configured to request additional information regarding the dispute. For example, the dispute resolution intelligence 248 may send such a request to the callback interface 244, which may post the request to the posting interface 226. The hosting entity 210 may provide notification to the party 250 of the request for additional information. In response, the party 250, via their electronic device, may provide the additional information to the hosting system 220 via the client interface 222 (e.g., by uploading files or otherwise providing the requested information). In these and other embodiments, the additional information may include any type of information, such as tracking information, item description, automated teller machine (ATM) receipts or videos, bank statements, police reports, proof of delivery signatures, etc. Such additional information may be provided in any format, such as Joint Photographic Experts Group (JPG) file, a Portable Document File (PDF), etc. In response to receiving the additional information, the hosting system 220 may provide the additional information to the third party computing system 240 via an API call through the API interface 224 of the hosting system 220 to the API interface 242 of the third party computing system 240. In response to receiving the API call with the additional information, the API interface 242 may provide the additional information to the dispute resolution intelligence 248 to be used in coming to a decision regarding the dispute and/or the dispute database 246 to store the additional information in conjunction with the dispute and/or the party 250.

In some embodiments, after coming to a decision regarding the dispute, the dispute intelligence 248 may be configured to provide the decision to the party 250. However, rather than interfacing directly with the electronic device of the party 250, the dispute resolution intelligence 248 may provide the decision to the callback interface 244 which may convey the decision to the posting interface 226 of the hosting system 220. In response to receiving the decision at the posting interface 226, the hosting entity 210 may resolve the dispute itself (e.g., by transferring assets from one party to another party). Additionally or alternatively, the hosting entity 210 may provide notification to the party 250 of the decision. For example, the hosting system 220 may update a field or data structure of the client interface 222 such that the party 250 is provided with the decision.

In some embodiments, the dispute database 246 may store information regarding preferences or settings of a given hosting entity 210. For example, for the hosting entity 210 certain parameters regarding dispute resolution may be selected or designated by the hosting entity 210 such that decisions on disputes may be provided in a personalized manner to the hosting entity 210. For example, certain transaction amounts, certain purchase categories, certain parties or categories of parties of the hosting entity 210, etc. may be more likely to have a dispute decided in their favor as indicated by the hosting entity 210. As another example, the hosting entity 210 may designate that the hosting entity 210 has authority to accept or overturn a decision rendered on the dispute by the third party computing system 240. As an additional example, the hosting entity 210 may designate that the third party computing system may send a resolution API call to the hosting system 220 to resolve the dispute based on the decision rendered by the dispute resolution intelligence 248 (e.g., the resolution API call may cause the hosting system 220 to transfer assets from one account to another, lock out an account, or take some other action based on the decision for the dispute). As another example, certain service level agreements (SLAs) may be used to indicate certain details of resolution, such as when the dispute is to be escalated to a human user for intervention rather than an automated resolution, whether to apply a provisional credit to either or both of the parties, certain rules for certain threshold amounts of transactions, and/or certain rules for certain party scores (e.g., a buyer or seller has a certain score indicating the trustworthiness and/or value of the party based on the history of the party).

In some embodiments, the hosting entity 210 may elect to override the decision provided by the third party computing system 240. In these and other embodiments, the hosting system 220 may communicate the election to override the decision to the third party computing system 240.

In some embodiments, the dispute resolution intelligence 248 may automatically modify certain dispute resolution decisions based on historical responses of the hosting entity 210 regarding accepting or overriding the decision rendered by the dispute resolution intelligence 248. For example, if certain categories of transactions are repeatedly overturned by the hosting entity 210, the dispute resolution intelligence 248 may, over time, shift and decide such disputes the other way for the particular hosting entity 210 that overturned the decisions, or for all disputes.

In some embodiments, the third party computing system 240 may include a client interface 249 to facilitate the third party computing system 240 interacting with an electronic device of the party 260 directly. For example, the party 260 may have an account with the third party entity 230. In some embodiments, the third party computing system 240 may interact with the electronic device of the party 260 via the callback interface 244. In some embodiments, the client interface 249 may be the same as the API interface 242 such that the party 260 may interact directly with the third party computing system 240 via the electronic device of the party 260 submitting API calls to the API interface 242 of the third party computing system 240.

Various examples of operation of the system 200 are contemplated by the present disclosure. As a first example, if the first party 250 is a purchaser in a transaction facilitated by the hosting entity 210, and the second party interfacing with the second hosting entity 211 is the seller in the transaction, the first party 250 may invoke a dispute resolution process via the client interface 222 on the hosting system 220. In response, the hosting system may submit an API call via the API interface 224 to the API interface 242 of the third party computing system 240. In response to receiving the API call to initiate the dispute resolution, the API interface 242 may provide the information in the API call to the dispute database 246 and/or the dispute resolution intelligence 248. The dispute resolution intelligence 248 may analyze the information from the initial API call to determine if there is sufficient data to render a decision on the dispute. If there is insufficient data, or additional data would be beneficial from the party 260, the dispute resolution intelligence 248 may send such a request to the callback interface 244 and/or the client interface 249 to send the request to the electronic device of the party 260. The party 260 may submit the additional information via the client interface 249 (which may include an API call from the electronic device of the party 260 to the API interface 242). In response to receiving the additional information, the third party computing system 240 may provide the additional information to the dispute database 246 to be store and to the dispute resolution intelligence 248 to be used in rendering a decision on the dispute. After a decision has been made by the dispute resolution intelligence 248, the dispute resolution intelligence 248 may provide that decision to the dispute database 246, the call back interface 244, and/or the client interface 249 such that the party 250 and the party 260 may be provided notice of the decision via the hosting system 220 and the third party computing system 240, respectively.

Other examples of operation of the system 200 may be described with reference to FIGS. 4-7.

Modifications, additions, or omissions may be made to the system 200 without departing from the scope of the present disclosure. For example, the system 200 may include more or fewer elements than those illustrated and described in the present disclosure. For example, the system 200 may include any number of parties involving any number of disputes. As another example, any number of hosting systems may be involved, such as the first party interfacing with a first hosting system and the second party interfacing with a second hosting system.

FIGS. 3A and 3B illustrate example systems 300a and 300b with user interfaces 312a and 312b utilized in the dispute resolution of FIGS. 1 and/or 2, in accordance with one or more embodiments of the present disclosure. The system 300a of FIG. 3A illustrates a system in which at least a portion of the user interface 312a on a display of an electronic device 310 is hosted by a third party computing system 330. The system 300b of FIG. 3A illustrates a system in which all portions of the user interface 312b on the display of the electronic device 310 are hosted by a hosting system 320. The user interfaces 312a and 312b may include multiple elements, including elements 313, 314, 315, and 318a/318b.

As illustrated in FIG. 3A, the system 300a may include the user interface 312a hosted by the hosting system 320. The user interface 312a may include an app interface, a web site interface, or any other user interface via which the electronic device of a user may be used to interact with the hosting system 320. For example, the user interface 312a may include multiple elements 313, 314, and 315 which are hosted, maintained, and operated by the hosting system 320.

The user interface 312a additionally includes an element 318a that is hosted by the third party computing system 330. For example, the element 318a may be generated based on a Java Script or other scripting that may cause the electronic device 310 to include portions of content from the third party computing system 330 in the element 318a. In these and other embodiments, the overall user interface 312a may maintain a consistent user experience as offered by the hosting system 320 via the elements 313, 314, and 315. In these and other embodiments, rather than redirecting the electronic device 310 to the third party computing system 330, the Java Script or other programming associated with the element 318a may maintain the consistent user experience offered by the hosting system 320. Such an arrangement may permit the hosting system 320 to maintain visibility and actual interaction with those who have accounts with the hosting system 320 while still permitting the electronic device 310 to obtain and display data from the third party computing system 330. For example, the element 318a may present options and operations associated with dispute resolution and may be generated and invoked based on a user of the electronic device 310 interacting with an element (such as the element 315) to invoke a dispute resolution process, which may cause the Java Script to run to create the connection with the third party computing system 330 for the element 318a.

As illustrated in FIG. 3B, the system 300b may be similar or comparable to the system 300a of FIG. 3A. The user interface 312b may include the element 318b that is hosted and operated by the hosting system 320. For example, rather than obtaining information directly from the third party computing system 330 into the element 318a, the element 318b may obtain information and interact with the hosting system 320. In these and other embodiments, the hosting system 320 may obtain information, send API calls, etc. with the third party computing system 330 and may provide that information via the element 318b to the electronic device 310.

Modifications, additions, or omissions may be made to the systems 300a/300b without departing from the scope of the present disclosure. For example, the systems 300a/300b may include more or fewer elements than those illustrated and described in the present disclosure. For example, the systems 300a/300b may include any number of user interface elements, any number of which may be configured to be hosted and interface with the hosting system 320 and/or the third party computing system 330.

Figure 4:
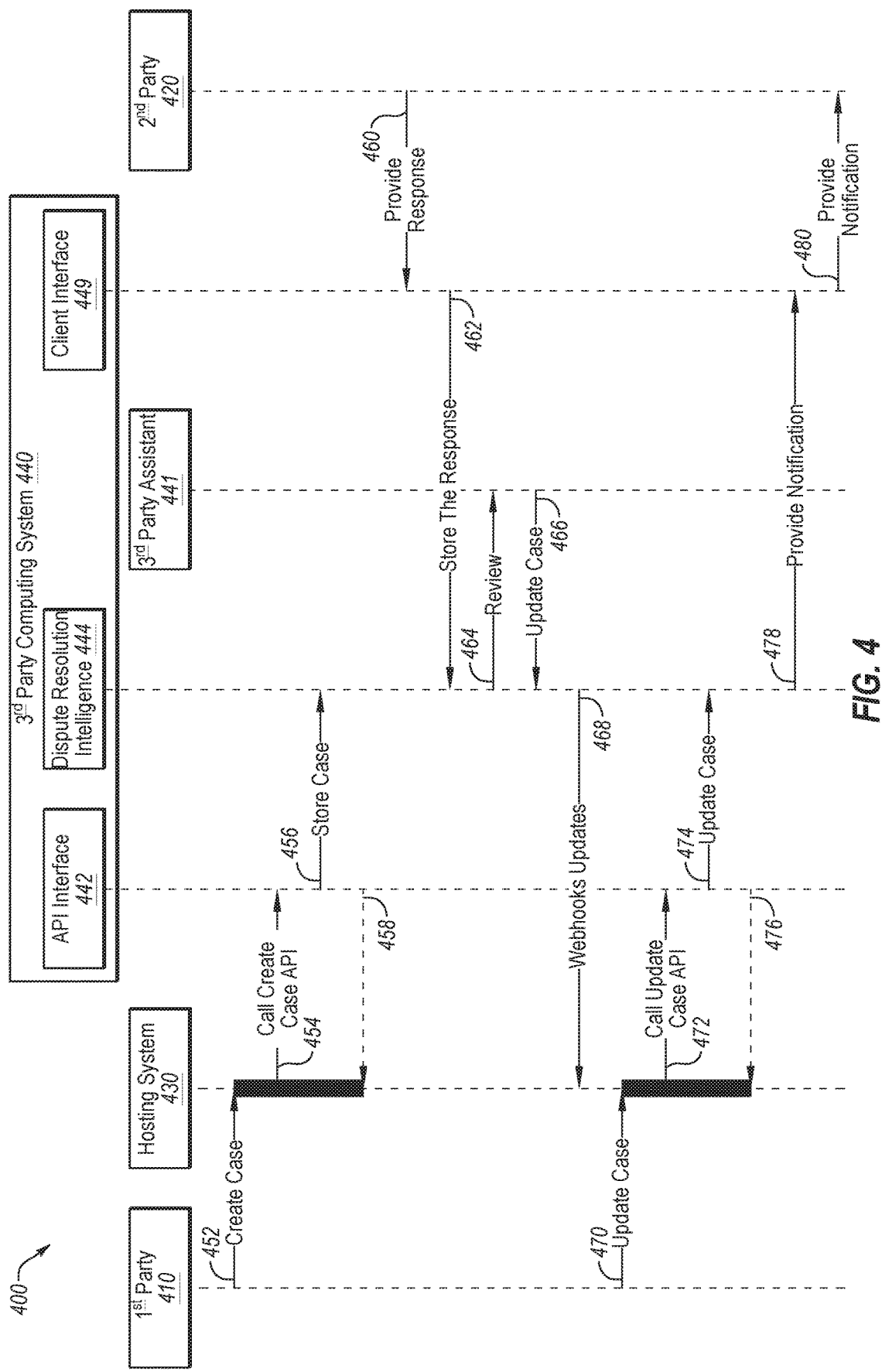
FIGS. 4-7 illustrate various example swim lane diagrams illustrating various operations associated with interfacing with a dispute resolution system.
Figure 5:
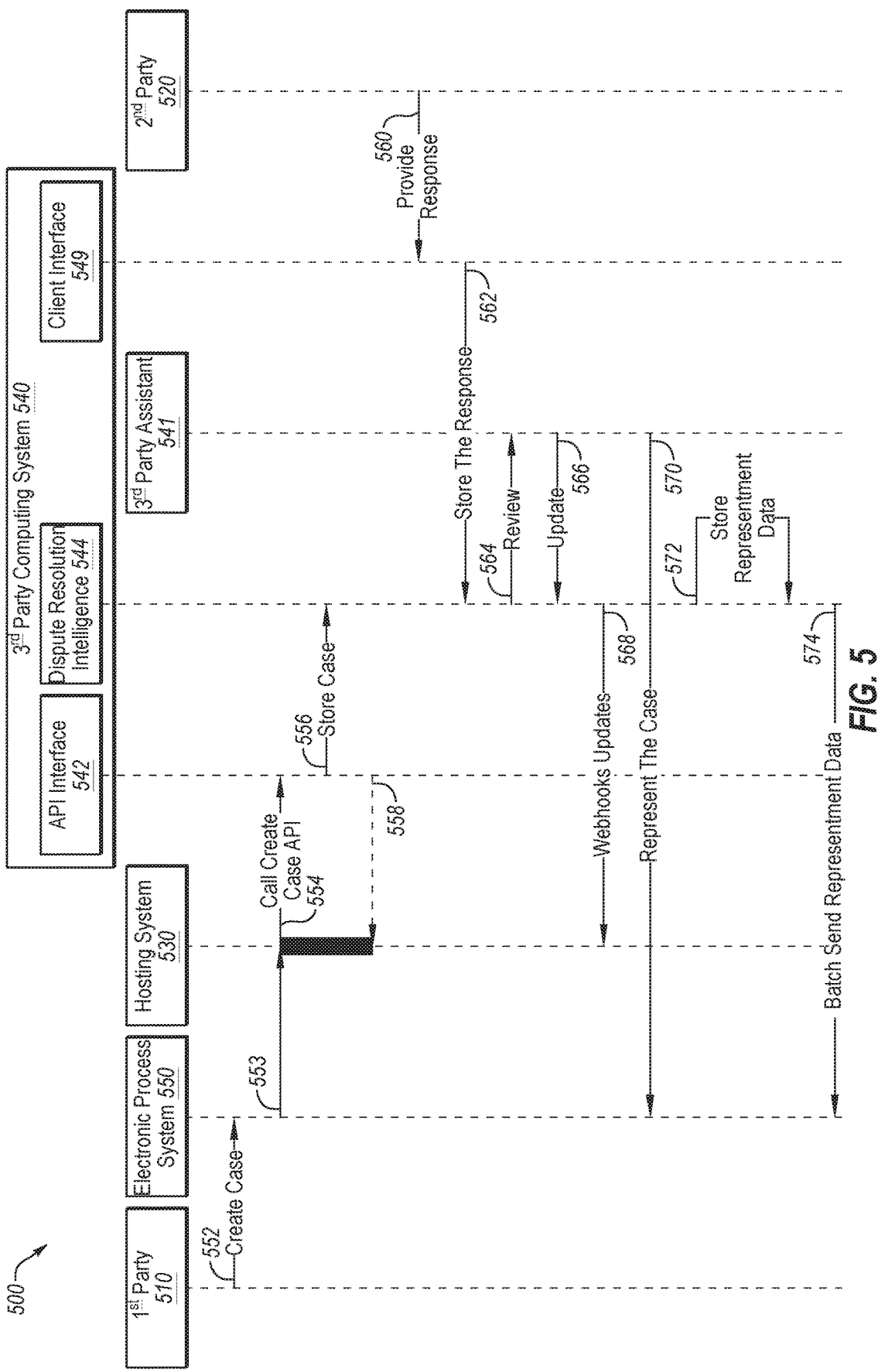
Figure 6:
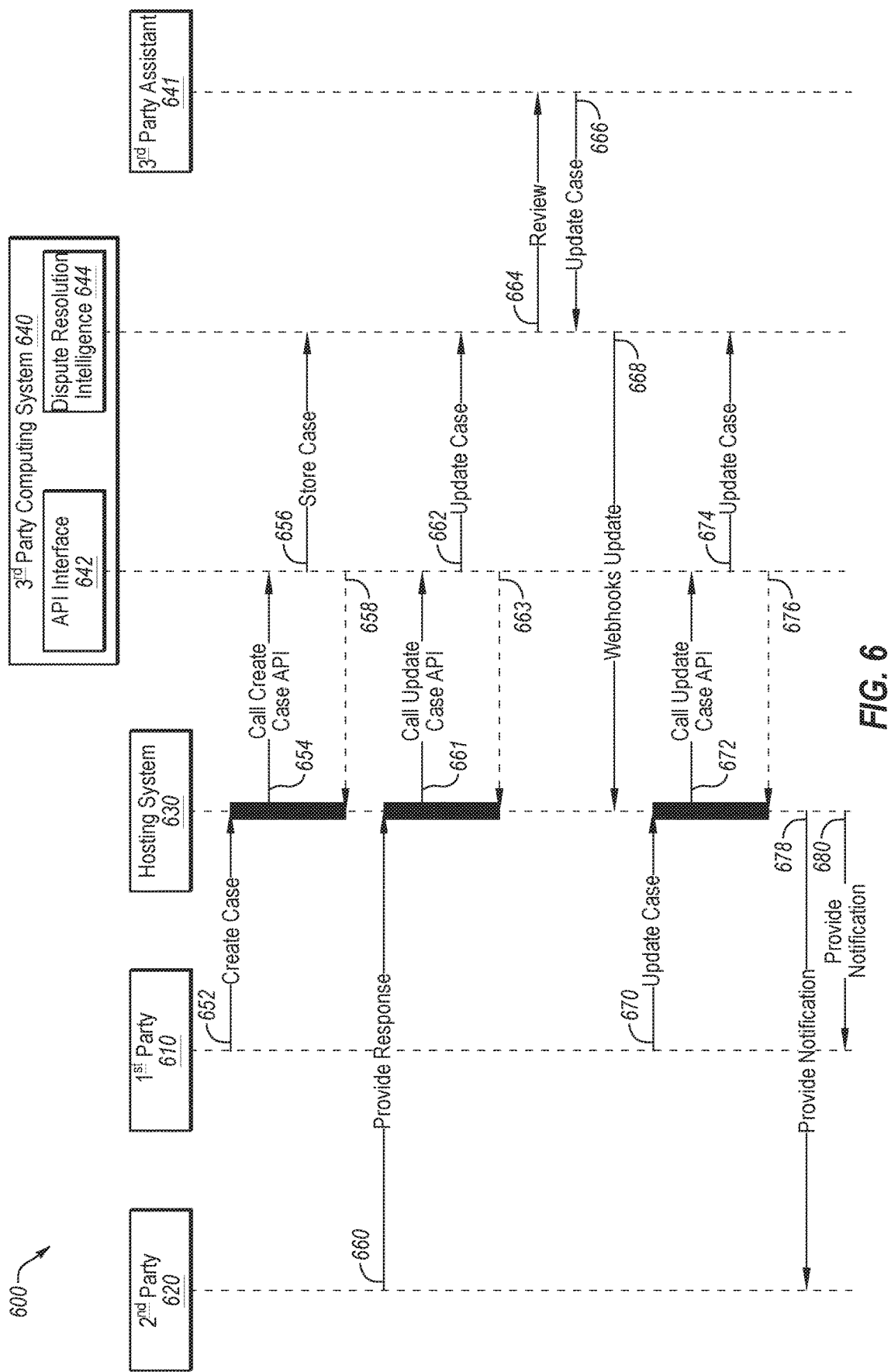
Figure 7:
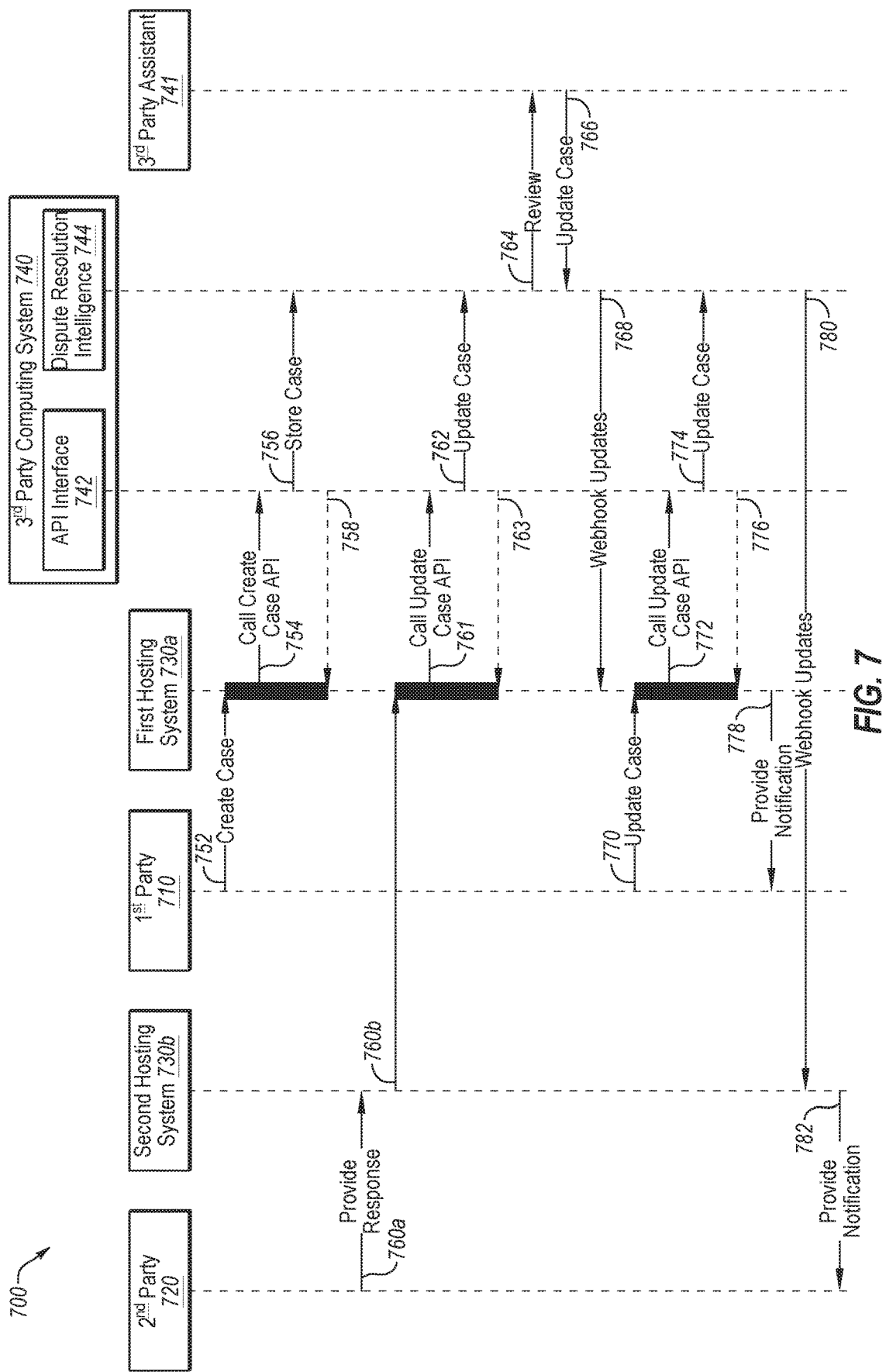

FIGS. 4-7 illustrate various example swim lane diagrams 400, 500, 600, and 700, respectively, illustrating various operations associated with interfacing with a dispute resolution system, in accordance with one or more embodiments of the present disclosure. FIG. 4 illustrates an embodiment in which a first party 410 to a dispute includes an account or other association with a hosting system 430 and a second party 420 to the dispute includes an account or other association with the third party computing system 440. FIG. 5 illustrates an embodiment in which a first party 510 initiates a dispute with an electronic process system 550 rather than the hosting system 530 with which the first party 510 has an account or other association, and in which a second party 520 to the dispute includes an account or other association with the third party computing system 540. FIG. 6 illustrates an embodiment in which a first party 610 to a dispute includes an account or other association with a hosting system 630 and a second party 620 to the dispute includes an account or other association with the same hosting system 640 as the first party 610. FIG. 7 illustrates an embodiment in which a first party 710 to a dispute includes an account or other association with a hosting system 730a and a second party 720 to the dispute includes an account or other association with a second hosting system 730b.

As illustrated in FIG. 4, at the action 452, the first party 410 may interact with the hosting system 430 with which the first party 410 has an account to initiate a dispute. Such an interaction may include invoking a user interface element or any other interaction with the hosting system 430 to request that a dispute case be created.

At the action 454, in response to the interaction from the first party 410 to create a dispute resolution case, the hosting system 430 may call the "Create Case" API call to the API Interface 442 of the third party computing system 440. The information in the call may include any information pertinent to the dispute, including the nature of the dispute, details of the dispute (e.g., parties to the dispute, accounts of the parties to the dispute, a transaction or interaction leading to the dispute, payment method in the transaction, documentation of the dispute, etc.).

At the action 456, the API interface 442 may route the call to the dispute resolution intelligence 444 to store the dispute resolution case. For example, as described above, information regarding the dispute may be stored in a dispute database to be accessed and used by the dispute resolution intelligence 444 in rendering a decision on the dispute.

At action 458, a response may be provided to the hosting system 430 in response to the API call at action 454 indicating that the dispute case has been created, such as an acknowledgment or approval response. Additionally or alternatively, the action 458 may request information from the first party 410 that may be sent to the first party 410 via the hosting system 430.

At action 460, the second party 420 may provide a response to the dispute case created at the object 456. For example, as the second party 420 signs into an account with the third party computing system 440, the second party 420 may observe a new dispute case and may provide details regarding the dispute via their electronic device and through the client interface 449.

At action 462, the response from the second party 420 may be stored by the dispute resolution intelligence 444 in the dispute database such that the response may be used by the dispute resolution intelligence in rendering a decision regarding the dispute. If the dispute resolution intelligence is able to render a decision based on the available information, the actions 464 and 466 may be skipped.

At action 464, if no decision can be determined by the dispute resolution intelligence 444 or if the decision is within a threshold of a close case, the dispute case (potentially including the decision) may be provided to a third party assistant 441 to review the dispute case. The third party assistant 441 may analyze and review the available information and may approve the proposed decision, reverse the proposed decision, or may render a decision if no decision had been proposed. In some embodiments, the third party assistant 441 may request additional information from one or more of the parties to the dispute.

At action 466, the dispute case may be updated in the dispute database based on the review performed by the third party assistant 441.

At action 468, the dispute resolution intelligence 444 may provide an update to the hosting system 430 regarding the state of the dispute case via a webhook update or other call back. For example, if the dispute resolution intelligence 444 and/or the third party assistant 441 seeks additional information from the first party 410, the call back interface of the third party computing system 440 may post information to the hosting system 430 requesting additional information from the first party 410. As another example, the dispute resolution intelligence 444 may route a notification of the decision rendered (whether with input from the third party assistant 441 or not) via a webhooks update to the hosting system 430. For example, with reference to FIG. 2, the dispute resolution intelligence 248 may route a message with the decision to the callback interface 244 via which the third party computing system 240 may post information to the posting interface 226 with the rendered decision. If a decision is rendered and the result is provided to the hosting system 430, the actions 470, 472, 474, and 476 may be omitted.

At action 470, the first party 410 may provide additional information to update the dispute case. For example, in response to a notification by the hosting system 430, the first party 410 may upload additional files or additional information to update the dispute case.

At action 472, in response to receiving additional information, the hosting system 430 may submit an API call to invoke the Update Case API to the API interface 442 of the third party computing system 440 to facilitate update of the case with information from the first party 410 while still permitting the first party 410 to interface directly with the hosting system 430.

At action 474, the API interface 442 may route the call to the dispute resolution intelligence 444 to store the updated information to update the case in the dispute database. For example, as described above, information regarding the dispute may be stored in a dispute database to be accessed and used by the dispute resolution intelligence 444 in rendering a decision on the dispute.

At action 476, a response may be provided to the hosting system 430 in response to the API call at action 474 indicating that the dispute case has been updated, such as an acknowledgment or approval response.

At action 478, the dispute resolution intelligence 444 may provide notification to the client interface 449 to be conveyed to the second party 420. For example, the notification may inform the second party 420 of the additional information provided by the first party 410 and/or notify the second party 420 regarding a decision rendered by the dispute resolution intelligence.

At the action 480, the second party 420 may be provided the notification via the client interface 449 of the third party computing system 440.

FIG. 5 illustrates an embodiment in which a first party 510 initiates a dispute with an electronic process system 550 rather than the hosting system 530 with which the first party 510 has an account or other association, and in which a second party 520 to the dispute includes an account or other association with the third party computing system 540.

At the action 552, the first party 510 to a dispute may interact with the electronic process system 550 that provided electronic clearing or processing of a transaction in which the first party 510 was involved. For example, the first party 510 may request a chargeback via their credit card processor. Such an interaction may include invoking a user interface element or any other interaction with the electronic process system 550.

At action 553, the electronic process system 550 may provide notification to the hosting system 530 of the dispute as initiated by the first party 510. For example, the hosting system 530 may receive a chargeback from the electronic process system 550.

At action 554, in response to receiving the notification from the electronic process system 550, the hosting system 530 may invoke the Create Case API call to the API interface 542 of the third party computing system 540. The action 554 may be similar or comparable to the action 454 of FIG. 4.

The actions 556, 558, 560, 562, 564, 566, and 568 may be similar or comparable to the actions 456, 458, 460, 462, 464, 466, and/or 468 of FIG. 4, respectively, with the recognition that the diagram 500 includes the variation that the dispute was presented to the hosting system 530 via the electronic process system 550 rather than by the first party 510 directly.

At action 570, the third party assistant 541 may represent the dispute case. For example, the electronic process system 550 may present the hosting system 530 with a chargeback. In response to the stored response of the second party 520, the third party assistant 541 may render a decision to represent the chargeback. Additionally or alternatively, the dispute resolution intelligence 544 may render the decision and may format the data of the representment in a proper format for the particular electronic process system 550.

Alternatively, at action 572, the representment data may be stored such that multiple representments for various disputes for the electronic process system 550 may be accumulated in a single batch.

At action 574, the batch of representments may be sent to the electronic process system 550.

FIG. 6 illustrates an embodiment in which a first party 610 to a dispute includes an account or other association with a hosting system 630 and a second party 620 to the dispute includes an account or other association with the same hosting system 640 as the first party 610.

The actions 652, 654, 656, and 658 may be similar or comparable to the actions 452, 454, 456, and/or 458 of FIG. 4, respectively. However, in some embodiments, at action 656 an additional object may be created by the dispute resolution intelligence. For example, the dispute resolution intelligence may create a party object for the first party 620 as being associated with the dispute object created. In these and other embodiments, the party object may be used by the third party computing system 640 to monitor and track disputes associated with the first party 620 such that future decisions regarding disputes may include the history of disputes involving the first party 620. By using the party object, the first party 620 may continue to interface directly and only with the hosting system 630, while the third party computing system 640 may benefit from tracking the history of disputes involving the first party 620. In some embodiments, such tracking of the first party 620 may occur across multiple hosting systems.

At action 660, the second party 620 may provide a response directly to the hosting system 630. For example, in response to the notification at action 658, the hosting system 630 may notify the second party 620. Such notification may include an active notification (e.g., an email, text message, app indicator, or some other pushed notification) or a passive notification (e.g., a flag on the account of the second party 620 such that when the second party 620 logged in to their account with the hosting system 630, a notification is present). In these and other embodiments, the content of the response may be similar or comparable to the content of the response at action 460 of FIG. 4.

At action 661, the hosting system 630 may call the Update Case API to send the response from the second party 620 to the API interface 642 of the third party computing system 640. The actions 661, 662, and/or 663 may be similar or comparable to the actions 472, 474, and/or 476 of FIG. 4, although the actions may include the information from the second party 620 provided to the hosting system 630 rather than from the first party 610 provided to the hosting system 630.

The actions 664, 666, 668, 670, 672, 674, and/or 676 may be similar or comparable to the actions 464, 466, 468, 470, 472, 474, and/or 476 of FIG. 4, respectively.

At actions 678 and 680, the hosting system 630 may provide notification to the first party 610 and/or the second party 620 of the decision regarding the dispute. In these and other embodiments, the decision provided by the hosting system 630 may be different from the decision of the third party computing system 640. For example, the hosting system 630 may override such a decision. Additionally or alternatively, the notification may include a notification that the dispute has been resolved, e.g., the hosting system 630 has transferred one or more assets between and/or among the first party 610 and/or the second party 620 based on the rendered decision.

FIG. 7 illustrates an embodiment in which a first party 710 to a dispute includes an account or other association with a hosting system 730a and a second party 720 to the dispute includes an account or other association with a second hosting system 730b.

The actions 752, 754, 756, and 758 may be similar or comparable to the actions 452, 454, 456, and/or 458 of FIG. 4, respectively.

At action 760a, the second party 720 may provide a response to the dispute to the second hosting system 730b. In some embodiments, the second hosting system 730b may be provided notification of the dispute case from a webhook update from the third party computing system 740. Additionally or alternatively, the second hosting system 730b may be provided notification of the dispute case from the first hosting system 730a.

At action 760b, in response to receiving the response from the second party 720, the second hosting system 730b may provide the response to the first hosting system 730a. Additionally or alternatively, the second hosting system 730b may provide the response directly to the third party computing system 740 via an API call (such as the Update Case API call) to the API interface 742 of the third party computing system 740. For example, the second hosting system 730b may independently have a relationship with the third party computing system 740 and/or may have a relationship with the first hosting system 730a via which the second hosting system 730b interfaces with the third party computing system 740. For example, the first hosting system 730a may provide a marketplace via which the second party 720, via the second hosting system 730b posts listings of goods or services for sale. If a dispute arises based on a transaction between the first party 710 and the second party 720, the first party 710 may interface with the first hosting system 730a to initiate the dispute and the second party 720 may interface with the second hosting system 730b to provide input into the dispute resolution process as handled by the third party computing system 740.

The actions 761, 762, 763, 764, 766, 768, 770, 772, 774, and/or 776 may be similar or comparable to the actions 661, 662, 663, 664, 666, 668, 670, 672, 674, and/or 676 of FIG. 6, respectively.

At action 778, the first hosting system 730a may provide notification to the first party 710. The action 778 may be similar or comparable to the action 680 of FIG. 6.

At action 780, the third party computing system 740 may provide notification via a webhook update or other call back to the second hosting system 730b of the decision rendered on the dispute via the dispute resolution intelligence 744. In these and other embodiments, the third party computing system 740 may identify the second hosting system 730b to provide an update due to information obtained (e.g., at actions 756 and/or 762). In these and other embodiments, despite the second hosting system 730b passing along information to the first hosting system 730a to invoke the API calls to facilitate resolution of the dispute, notifications from the third party computing system 740 may be provided directly to the second hosting system 730b via webhook updates or other call back routines.

At action 782, the second hosting system 730b may provide notification to the second party 720 of the decision as received by the second hosting system 730b.

Modifications, additions, or omissions may be made to the diagrams 400, 500, 600, and/or 700 without departing from the scope of the present disclosure. For example, the actions of the diagrams 400, 500, 600, and/or 700 may be implemented in differing order. Additionally or alternatively, two or more operations may be performed at the same time, repeated, etc. Furthermore, the outlined actions are only provided as examples, and some of the actions may be optional, combined into fewer operations and actions, or expanded into additional actions without detracting from the essence of the disclosed embodiments.

Figure 8:
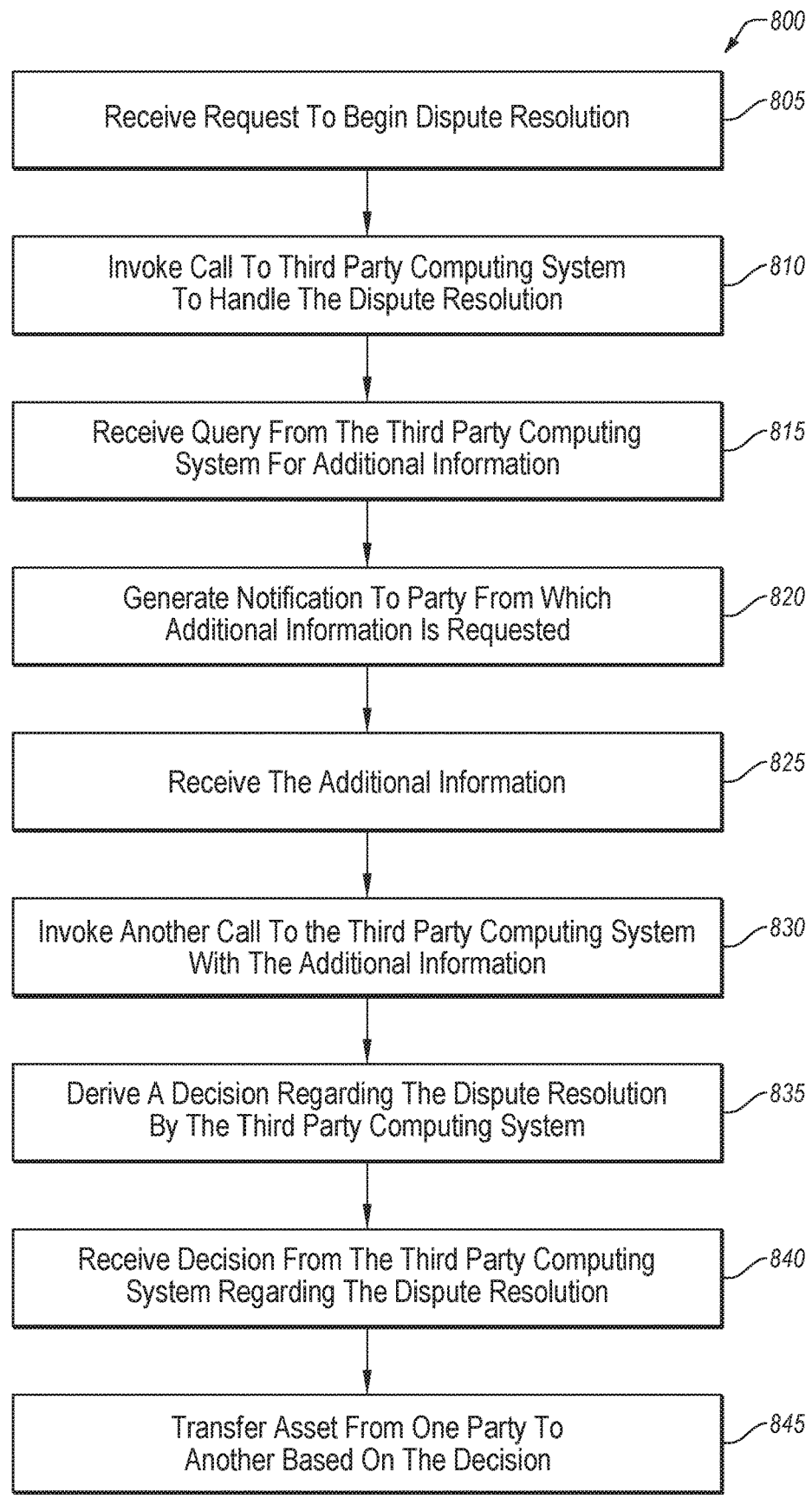
FIG. 8 illustrates a flowchart of an example method of interfacing with a dispute resolution system.

FIG. 8 illustrates a flowchart of an example method 800 of interfacing with a dispute resolution system, in accordance with one or more embodiments of the present disclosure. The method 800 may be performed by any suitable system, apparatus, or device with respect to dispute resolution for a hosting system. For example, the hosting system 130 of FIG. 1/220 of FIG. 2, the third party computing system 140 of FIG. 1/240 of FIG. 2, or the computing system 1000 of FIG. 10 may perform or direct performance of one or more of the operations associated with the method 800. Although illustrated with discrete blocks, the steps and operations associated with one or more of the blocks of the method 800 may be divided into additional blocks, combined into fewer blocks, or eliminated, depending on the particular implementation.

At block 805, a request to begin a dispute resolution process may be received. For example, a first party to a dispute may invoke a user interface element of an interface provided by a hosting system to the first party to request that a dispute resolution case be created for resolving a dispute with which the first party was involved.

At block 810, a call may be invoked to a third party computing system to handle the dispute resolution process. For example, in response to receiving the invocation of the user interface, the hosting system may submit an API call to the third party computing system. The API call may include information regarding the dispute.

At block 815, a query may be received from the third party computing system for additional information regarding the dispute. For example, the query may be received as a webhook update or other call back process by which the third party computing system may provide the query to the hosting system based on the hosting system submitting the API call. Additionally or alternatively, the webhook update or other call back may be sent to the hosting system based on information in the call invoked at block 810 identifying a second party to the dispute as being associated with the hosting system.

At block 820, a notification may be generated to the party from which additional information is requested. For example, the hosting system may provide an active notification to the party or may provide a passive notification to the party.

At block 825, the additional information may be received from the party from which the additional information was sought. For example, the party may upload documents via the user interface of the hosting system. As another example, the party may enter textual information or other data via an electronic device of the party, which is communicated to the hosting system.

At block 830, another call may be invoked to the third party computing system with the additional information received from the party. For example, the hosting system may invoke an Update Case API call that is sent to an API interface of the third party computing system to provide the additional information to the third party computing system (e.g., such that the additional information may be stored in a dispute database of the third party computing system and/or be used by dispute resolution intelligence of the third party computing system to render a decision regarding the dispute).

At block 835, a decision regarding the dispute resolution may be derived by the third party computing system. For example, the dispute resolution intelligence of the third party computing system may derive a decision for the dispute based on information in the dispute database and/or information received from the parties to the dispute. For example, the dispute resolution intelligence may retrieve information regarding one or both of the parties from previous transactions and/or disputes to facilitate a decision regarding the dispute.

At block 840, the hosting system may receive the decision from the third party computing system regarding the dispute resolution. For example, the third party computing system may post the decision to a posting location of the hosting system via a call back function such as a webhook.

At block 845, the hosting system may transfer an asset from one party to another based on the decision. For example, an asset from an account of a losing party of the dispute may be transferred to an account of the party in whose favor the dispute was decided.

Modifications, additions, or omissions may be made to the method 800 without departing from the scope of the present disclosure. For example, the operations of method 800 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 9:
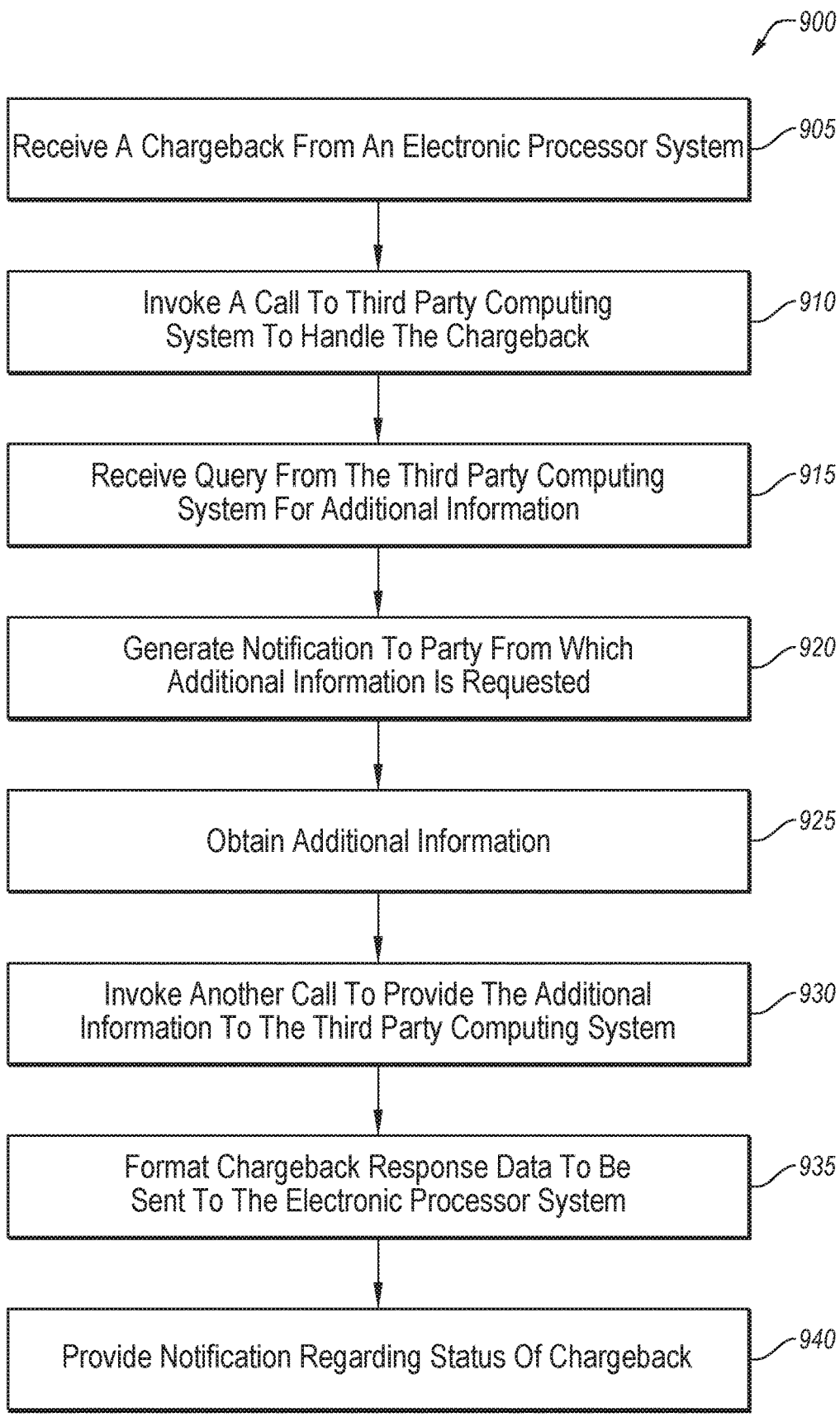
FIG. 9 illustrates a flowchart of an example method of chargeback resolution when interfacing with a dispute resolution system.

FIG. 9 illustrates a flowchart of an example method 900 of chargeback resolution when interfacing with a dispute resolution system, in accordance with one or more embodiments of the present disclosure. The method 900 may be performed by any suitable system, apparatus, or device with respect to dispute resolution for a hosting system. For example, the hosting system 130 of FIG. 1/220 of FIG. 2, the third party computing system 140 of FIG. 1/240 of FIG. 2, or the computing system 1000 of FIG. 10 may perform or direct performance of one or more of the operations associated with the method 900. Although illustrated with discrete blocks, the steps and operations associated with one or more of the blocks of the method 900 may be divided into additional blocks, combined into fewer blocks, or eliminated, depending on the particular implementation.

At block 905, a chargeback may be received from an electronic processor system. For example, a first party to a dispute may file a chargeback with the electronic processor system, and the electronic processor system may send the chargeback to the hosting system.

At block 910, a call may be invoked to a third party computing system to handle the chargeback. For example, an API call may be sent from the hosting system to an API interface of the third party computing system to handle the chargeback. In these and other embodiments, the API call may be similar or comparable to the API call of the block 810 of FIG. 8, although with information regarding the chargeback.

At block 915, a query may be received from the third party computing system regarding additional information. The block 915 may be similar or comparable to the block 815 of FIG. 8.

At block 920, a notification may be generated to the party from which additional information is requested. The block 920 may be similar or comparable to the block 820 of FIG. 8.

At block 925, the additional information may be obtained. For example, the party may upload documents via the user interface of the hosting system. As another example, the party may enter textual information or other data via an electronic device of the party, which is communicated to the hosting system.

At block 930, another call may be invoked to the third party computing system with the additional information received from the party to provide the additional information to the third party computing system. The block 930 may be similar or comparable to the block 830.

At block 935, the chargeback response data (e.g., the representment data) may be formatted to be sent to the electronic processing system. For example, the third party computing system may format the data in a particular data structure utilized and recognized by the electronic processor system that sent the chargeback at block 905. In some embodiments, the chargeback response data may be provided directly from the third party computing system to the electronic processor system. Additionally or alternatively, the chargeback response data in the particular data structure may be provided to the hosting system to send to the electronic processor system. As another embodiment, the third party computing system may collect multiple chargeback responses and send a batch of chargeback responses in a single communication to the electronic processor system.

At block 940, notification may be provided regarding the status of the chargeback. For example, the third party computing system may post information (e.g., via a webhook or other call back procedure) to a posting location of the hosting system regarding the status of the dispute. Such status may include a notification that the chargeback has been represented, that the chargeback has been accepted and will not be challenged, that the chargeback resolution is awaiting additional information, etc.

Modifications, additions, or omissions may be made to the method 900 without departing from the scope of the present disclosure. For example, the operations of method 900 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

FIG. 10 illustrates an example computing system, according to at least one embodiment described in the present disclosure. The system 1000 may include any suitable system, apparatus, or device configured to facilitate dispute resolution for a hosting system. The computing system 1000 may include a processor 1010, a memory 1020, a data storage 1030, a communication unit 1040, an interface device 1050, and a display 1060, which all may be communicatively coupled. The data storage 1030 may include various types of data, such as computer-readable instructions to perform operations to facilitate interfacing with a dispute resolution system with dispute resolution intelligence.

Generally, the processor 1010 may include any suitable special-purpose or general-purpose computer, computing entity, or processing device including various computer hardware or software modules and may be configured to execute instructions stored on any applicable computer-readable storage media. For example, the processor 1010 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 10, it is understood that the processor 1010 may include any number of processors distributed across any number of network or physical locations that are configured to perform individually or collectively any number of operations described in the present disclosure. In some embodiments, the processor 1010 may interpret and/or execute program instructions and/or process data stored in the memory 1020, the data storage 1030, or the memory 1020 and the data storage 1030. In some embodiments, the processor 1010 may fetch program instructions from the data storage 1030 and load the program instructions into the memory 1020.

After the program instructions are loaded into the memory 1020, the processor 1050 may execute the program instructions, such as instructions to perform one or more of the operations illustrated in the swim lane diagrams 400, 500, 600, and/or 700 and/or the methods 700 and/or 800 of FIGS. 4-8, respectively. For example, the processor 1010 may obtain instructions regarding a user interface with elements hosted by a hosting system and other elements hosted by a third party computing system.

The memory 1020 and the data storage 1030 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 1010. In some embodiments, the computing system 1000 may or may not include either of the memory 1020 and the data storage 1030.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1010 to perform a certain operation or group of operations.

The communication unit 1040 may include any component, device, system, or combination thereof that is configured to transmit or receive information over a network. In some embodiments, the communication unit 1040 may communicate with other devices at other locations, the same location, or even other components within the same system. For example, the communication unit 1040 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 1040 may permit data to be exchanged with a network and/or any other devices or systems described in the present disclosure. For example, the communication unit 1040 may allow the system 1000 to communicate with other systems, such as computing devices and/or other networks.

The interface device 1050 may include any device to allow a user to interface with the system 1000. For example, the interface device 1050 may include a mouse, a track pad, a keyboard, and/or a touchscreen, among other devices. The interface device 1050 may receive input from a user and provide the input to the processor 1010.

The display 1060 may be configured as one or more displays, like an LCD, LED, or other type of display. The display 1060 may be configured to present content such as video, text captions, user interfaces, and other data as directed by the processor 1010. For example, when the system 1000 is included in an electronic device of the first party and/or second party of FIGS. 1-2, and/or 4-7, the display 1060 may be configured to present a user interface such as that illustrated in FIGS. 3A and/or 3B.

Modifications, additions, or omissions may be made to the system 1000 without departing from the scope of the present disclosure. For example, the data storage 1030 may be multiple different storage mediums located in multiple locations and accessed by the processor 1010 through a network.

As indicated above, the embodiments described in the present disclosure may include the use of a special purpose or general purpose computer (e.g., the processor 1010 of FIG. 10) including various computer hardware or software modules, as discussed in greater detail below. Further, as indicated above, embodiments described in the present disclosure may be implemented using computer-readable media (e.g., the memory 1020 of FIG. 10) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
    receiving, at an application program interface (API) of a third-party computing system, an API call related to a dispute initiated by a user via an electronic device, the API call including dispute information related to the dispute and being received from a hosting system in response to the hosting system receiving a request, from the electronic device, to invoke a dispute resolution to the dispute;
    communicating, by the API in response to the API call, the dispute information to dispute resolution intelligence of the third-party computing system such that the API enables the hosting system to interface with the third-party computing system using the API call to allow the hosting system to use the dispute resolution intelligence to obtain a decision with respect to the dispute without redirecting the electronic device to interface directly with the third-party computing system;
    determining, by the dispute resolution intelligence based on the dispute information, the decision with respect to the dispute;
    providing the decision to a callback interface in response to the dispute information having been received from the API; and
    communicating, by the callback interface to the hosting system identified in response to the dispute information having been received from the API, the decision to the dispute resolution.

2. The method of claim 1, further comprising:
    determining, by the dispute resolution intelligence, whether a dispute database includes data regarding a second party to the dispute, the data indicative of an account of the second party with the third-party computing system;
    based on the second party including an account with the third-party computing system, communicating with an electronic device of the second party to the dispute via a client interface such that the electronic device of the user interacts directly with the hosting system and the electronic device of the second party interacts directly with the third-party computing system to resolve the dispute;
    in response to receiving a communication from the electronic device of the second party via the client interface, routing the communication to the dispute database; and communicating, by the client interface to the electronic device of the second party, the decision to the dispute resolution such that the electronic device of the second party receives the decision directly from the third-party computing system.

3. The method of claim 1, further comprising:
    receiving, at the API from the hosting system, notification that a second party to the dispute has an account with the hosting system;
    based on the second party including an account with the hosting system and in response to the dispute resolution intelligence seeking additional data regarding the dispute, communicating with an electronic device of the second party to the dispute via the callback interface to the hosting system such that the electronic device of the second party interacts directly with the hosting system rather than with the third-party computing system;
    receiving, at the API of the third-party computing system, a second API call related to the dispute, the second API call including the additional data and being received from the hosting system in response to the hosting system receiving the additional data from the electronic device of the second party;
    storing the additional data in conjunction with the dispute in a dispute database; and
    in response to storing the additional data, notifying the dispute resolution intelligence of arrival of the additional data such that the dispute resolution intelligence determines the decision further based on the additional data.

4. The method of claim 3, wherein the notification that the second party to the dispute has an account with the hosting system is included in the dispute information of the API call.

5. The method of claim 1, further comprising, based on the decision, communicating a resolution API call via the API to the hosting system, the resolution API call invoking the hosting system to resolve the dispute.

6. The method of claim 1, wherein the request is received by the hosting system via a graphical user interface provided by the hosting system and presented on the electronic device; and
    wherein the graphical user interface is configured such that continuity of a user experience of the user is maintained through maintaining presentation on the electronic device of the graphical user interface provided by the hosting system as opposed to presenting on the electronic device a graphical user interface provided by the third-party computing system.

7. The method of claim 1, further comprising performing one of:
receiving, at the API from a second hosting system, notification that a second party to the dispute has an account with the second hosting system; or
receiving, at the API from the hosting system, notification that the second party to the dispute has the account with the second hosting system, the notification included in the dispute information.

8. The method of claim 7, further comprising:
based on the second party including an account with the second hosting system and m response to the dispute resolution intelligence seeking additional data regarding the dispute, communicating with an electronic device of the second party to the dispute via the callback interface to the second hosting system such that the electronic device of the second party interacts directly with the second hosting system rather than with the third-party computing system;
receiving, at the API of the third-party computing system, a second API call related to the dispute, the second API call including the additional data and being received from the second hosting system in response to the second hosting system receiving the additional data from the electronic device of the second party;
storing the additional data in conjunction with the dispute in a dispute database; and
in response to storing the additional data, notifying the dispute resolution intelligence of arrival of the additional data such that the dispute resolution intelligence determines the decision further based on the additional data.

9. The method of claim 1, further comprising:
retrieving information from a dispute database of the third-party computing system not provided by the user or a second party to the dispute after the API call related to the dispute is received;
wherein the decision is based on the information from the dispute database.

10. A system comprising:
one or more processors; and
one or more non-transitory computer-readable media containing instructions which, when executed by the one or more processors, cause the system to perform operations comprising:
receiving, at an application program interface (API) of a third-party computing system, an API call related to a dispute initiated by a user via an electronic device, the API call including dispute information related to the dispute and being received from a hosting system in response to the hosting system receiving a request, from the electronic device, to invoke a dispute resolution to the dispute;
communicating, by the API in response to the API call, the dispute information to dispute resolution intelligence of the third-party computing system such that the API enables the hosting system to interface with the third-party computing system using the API call to allow the hosting system to use the dispute resolution intelligence to obtain a decision with respect to the dispute without redirecting the electronic device to interface directly with the third-party computing system;
determining, by the dispute resolution intelligence based on the dispute information, the decision with respect to the dispute;
providing the decision to a callback interface in response to the dispute information having been received from the API; and
communicating, by the callback interface to the hosting system identified in response to the dispute information having been received from the API, the decision to the dispute resolution.

11. The system of claim 10, wherein the electronic device is associated with a party to the dispute and the electronic device interfaces with the third-party computing system via the hosting system.

12. The system of claim 10, wherein the electronic device is associated with the hosting system and the API call is received from the electronic device in response to the hosting system receiving a request to invoke a dispute resolution to the dispute, the request being received by the hosting system via a graphical user interface provided by the hosting system and presented on a party electronic device associated with a party to the dispute.

13. The system of claim 12, further comprising:
receiving, at the API, notification that a second party to the dispute has an account with the hosting system;
based on the second party including an account with the hosting system and in response to the dispute resolution intelligence seeking additional data regarding the dispute, communicating with a second party electronic device of the second party to the dispute via the callback interface to the electronic device such that the second party electronic device interacts directly with the hosting system;
receiving, at the API of the third-party computing system, a second API call related to the dispute, the second API call including the additional data and being received from the hosting system in response to the hosting system receiving the additional data from the second party electronic device;
storing the additional data in conjunction with the dispute in a dispute database; and in response to storing the additional data, notifying the dispute resolution intelligence of arrival of the additional data such that the dispute resolution intelligence determines the decision further based on the additional data.

14. The system of claim 13, wherein the notification that the second party to the dispute has an account with the hosting system is included in the dispute information of the API call.

15. The system of claim 12, wherein the operations further comprise, based on the decision, communicating a resolution API call via the API to the electronic device, the resolution API call invoking the hosting system to resolve the dispute.

16. The system of claim 10, further comprising a dispute database and wherein the operations further comprise:
determining, by the dispute resolution intelligence, whether the dispute database includes data regarding a second party to the dispute, the data indicative of an account of the second party with the third-party computing system;
based on the second party including an account with the third-party computing system, communicating with an electronic device of the second party to the dispute via a client interface such that the electronic device of the second party interacts with the hosting system to resolve the dispute;

in response to receiving a communication from the hosting system via the electronic device of the second party via the client interface, routing the communication to the dispute database; and communicating, by the client interface to the electronic device of the second party, the decision to the dispute resolution such that the electronic device of the second party receives the decision from the hosting system.

17. The system of claim 16, wherein the operations further comprise:

receiving, at the API from the electronic device via the hosting system, notification that a second party to the dispute has an account with a second hosting system;

based on the second party including an account with the second hosting system and in response to the dispute resolution intelligence seeking additional data regarding the dispute, communicating with a second party electronic device of the second party to the dispute via the callback interface to the hosting system such that the second party electronic device interacts directly with the second hosting system rather than with the third-party computing system;

receiving, at the API of the third-party computing system, a second API call related to the dispute, the second API call including the additional data and being received from the second hosting system in response to the second hosting system receiving the additional data from the second party electronic device;

storing the additional data in conjunction with the dispute in a dispute database; and in response to storing the additional data, notifying the dispute resolution intelligence of arrival of the additional data such that the dispute resolution intelligence determines the decision further based on the additional data.

18. The system of claim 10, further comprising a dispute database and wherein the operations further comprise:

retrieving information from the dispute database related to at least one party to the dispute already stored in the dispute database when the API call related to the dispute is received;

wherein the decision is based on the information from the dispute database.

19. One or more non-transitory computer-readable media containing instructions which, when executed by one or more processors, cause a system to perform operations comprising:

receiving, at an application program interface (API) of a third-party computing system, an API call related to a dispute initiated by a user via an electronic device, the API call including dispute information related to the dispute and being received from a hosting system in response to the hosting system receiving a request, from the electronic device, to invoke a dispute resolution to the dispute;

communicating, by the API in response to the API call, the dispute information to dispute resolution intelligence of the third-party computing system such that the API enables the hosting system to interface with the third-party computing system using the API call to allow the hosting system to use the dispute resolution intelligence to obtain a decision with respect to the dispute without redirecting the electronic device to interface directly with the third-party computing system;

determining, by the dispute resolution intelligence based on the dispute information, the decision with respect to the dispute;

providing the decision to a callback interface in response to the dispute information having been received from the API; and communicating, by the callback interface to the hosting system identified in response to the dispute information having been received from the API, the decision to the dispute resolution.

20. The computer-readable media of claim 19, wherein the operations further comprise:

receiving, at the API from the hosting system, notification that a second party to the dispute has an account with the hosting system;

based on the second party including an account with the hosting system and in response to the dispute resolution intelligence seeking additional data regarding the dispute, communicating with an electronic device of the second party to the dispute via the callback interface to the hosting system such that the electronic device of the second party interacts directly with the hosting system rather than with the third-party computing system;

receiving, at the API of the third-party computing system, a second API call related to the dispute, the second API call including the additional data and being received from the hosting system in response to the hosting system receiving the additional data from the electronic device of the second party;

storing the additional data in conjunction with the dispute in a dispute database; and in response to storing the additional data, notifying the dispute resolution intelligence of arrival of the additional data such that the dispute resolution intelligence determines the decision further based on the additional data.

* * * * *